3,356,537
FOAMED SILVER ELECTRODE AND A METHOD FOR PREPARING IT

Joseph C. Duddy, Trevose, Pa., assignor, by mesne assignments, to ESB Incorporated, Philadelphia, Pa., a corporation of Delaware
No Drawing. Filed May 25, 1964, Ser. No. 370,089
5 Claims. (Cl. 136—120)

This invention relates to a foamed silver electrode and a method for preparing it. In particular, the invention relates to a high surface area, foamed electrode which is prepared from a silver oxide-silica composition.

It is well known in the electric battery art that foamed silver electrodes can be prepared by heating a mixture of finely divided silver oxide and a thermoplastic resin in such a manner that the resin is removed and oxygen is slowly released so as to blow or foam the resulting silver structure. Such a method of preparing foamed silver electrodes is disclosed in U.S. Patent No. 3,007,991 issued to Joseph C. Duddy on Nov. 7, 1961. As disclosed in said patent, the silver foams produced in this manner are quite fragile, have only minimal structurization and must be handled with great care. In addition, the preparation of foamed silver electrodes in this manner must be carried out with great care for the silver oxide-resin compositions are highly exothermic and may easily be exploded.

It is an object of this invention to provide a foamed silver electrode having a large surface area.

A further object of the invention is to provide a method for preparing a foamed silver electrode which avoids the hazards of a highly exothermic reaction.

Other objects, purposes and advantages of this invention will be apparent to those skilled in the art in view of the following description.

It has been discovered that a high surface area, foamed silver electrode can be prepared from intimate mixtures of monovalent silver oxide ($Ag_2O$) powder with a finely divided silica ($SiO_2$) powder. The proportion of silver oxide to silica in the intimately blended powders is not particularly critical and is a matter of operator's choice. Greater porosity can be achieved by using larger amounts of silica, but there must be sufficient silver present to form an electrically conductive electrode. In general, the silver oxide/silica ratio may vary from about 7:1 to about 8:1 parts by weight.

The silica-silver oxide powders are thoroughly mixed, such as by ball milling, in the selected proportions, and thereafter, the intimately blended powders may be shaped by compacting them through the application of pressure. Pressures ranging from about 5 to about 8 tons per square inch may be employed. The silver oxide-silica compositions may be shaped into any desired configuration, with disc-shaped electrodes being particularly preferred. The compacted, shaped silver oxide-silica composition is handleable but is rather fragile.

After the compacting process, the shaped silver oxide-silica composition is thermally treated to reduce the silver oxide ($Ag_2O$) to silver metal. This first thermal treatment is carried out within a temperature ranging from about 550° C. to about 600° C. which causes fluxing or passage through a fluid state followed by oxygen evolution to yield a rigid, foamed structure. The temperature during the first thermal treatment should be high enough to render the mass sufficiently fluid or plastic that the oxygen which is evolved foams or raises the mass, which subsequently sets similar to baked bread dough. The resulting highly porous foamed mass is electrically nonconductive, is citron yellow in color and presumably is silver silicate. In general, the first thermal treatment has a duration of from about 60 minutes to about 90 minutes, sufficient to form a foamed structure having a large surface area.

Upon completion of the relatively low temperature reduction treatment, the structurization of the foamed silver electrode is completed by sintering it at elevated temperatures, from 950° C. to about 1000° C. During the sintering process, additional oxygen may be evolved and the foamed silver structure becomes electrically conductive. The duration of the sintering treatment is not critical, and in general, it also is carried out for from about 60 minutes to about 90 minutes.

The foamed silver structures prepared in accordance with the method of this invention have a large surface area and good electrochemical properties, and therefore, they are useful as electrodes in devices involving electrochemical processes such as electric storage batteries and fuel cells. They are particularly useful as oxygen electrodes in fuel cells which are operated at high temperatures, for the silica matrix can withstand high temperatures. The structures have silver present with silica and have pores which are interconnected.

The following operative example illustrates a foamed silver electrode and its preparation in accordance with this invention.

EXAMPLE I

An intimate mixture of finely divided silica having an average particle size of about 0.015 microns and monovalent silver oxide ($Ag_2O$) powder was prepared. The powder mixture contained about 12% by weight of silica and 88% by weight of silver oxide. This powder mixture was compressed into a disc having a diameter of 1.5 inches and a thickness of 35 mils, at a pressure of 5 tons per square inch. The resulting disc-shaped mass was handleable but was quite fragile.

The disc-shaped, compressed silver oxide-silica composition was placed on a piece of expanded metal and was heated at 600° C. for 60 minutes to reduce the silver oxide to silver metal and to foam the structure. As evidenced by the honeycomb structure and the encapsulation of the expanded metal, the silver oxide-silica mixture had passed through the fluid or plastic stage. The resulting foamed structure was electrically nonconductive and was citron yellow in color. Thereafter, the foamed structure was further heated to 1000° C. for about 90 minutes to sinter it. Additional oxygen was evolved and the resulting structure was rendered electrically conductive.

Having completely described this invention, what is claimed is:

1. A method for preparing a foamed silver electrode which comprises forming a mixture of monovalent silver oxide powder with a silica powder, the weight ratio of silver oxide to silica ranging from about 7:1 to about 8:1, to form an electrically conductive electrode, shaping the silver oxide-silica composition by compressing it under a pressure ranging from about 5 to about 8 tons per square inch, heating the shaped silver oxide-silica composition to a temperature ranging from 550° C. to about 600° C. so as to decompose silver oxide to generate oxygen and produce a foamed structure of silver and silica, and thereafter sintering the foamed structure at a temperature ranging from about 950° C. to about 1000° C., the method producing a foamed porous electrode in which silver is present with silica and in which the pores are interconnected.

2. A method in accordance with claim 1 in which the heating of the shaped silver oxide-silica composition at a temperature ranging from about 550° C. to about 600° C. has a duration of from about 60 minutes to about 90 minutes.

3. A method in accordance with claim 2 in which the sintering at a temperature ranging from about 950° C. to about 1000° C. is carried out for from about 60 minutes to about 90 minutes.

4. A method in accordance with claim 3 in which the silver oxide-silica powder composition is compressed into a disc shape.

5. A foamed porous electrode in which silver is present with silica and in which the pores are interconnected, prepared in accordance with the method of claim 1.

References Cited

UNITED STATES PATENTS

| | | | |
|---|---|---|---|
| 2,012,617 | 8/1935 | Munters | 75—20 X |
| 3,007,991 | 6/1958 | Duddy | 75—222 |
| 3,024,110 | 3/1962 | Funkhouser et al. | 29—182.5 |

OTHER REFERENCES

Webster's New Collegiate Dictionary, G. & C. Merriam Co., Springfield, Mass. (1958); page 539 relied on.

ALLEN B. CURTIS, *Primary Examiner.*

WINSTON A. DOUGLAS, *Examiner.*

N. P. BULLOCH, O. F. CRUTCHFIELD,

*Assistant Examiners.*